US006903777B1

(12) United States Patent
Arisaka

(10) Patent No.: US 6,903,777 B1
(45) Date of Patent: Jun. 7, 2005

(54) LENS SHUTTER FOR DIGITAL STILL CAMERAS

(75) Inventor: Kunio Arisaka, Urawa (JP)

(73) Assignee: Nidec Copal Corporation, Tokyo (JP)

( * ) Notice: Subject to any disclaimer, the term of this patent is extended or adjusted under 35 U.S.C. 154(b) by 793 days.

(21) Appl. No.: 09/689,679

(22) Filed: Oct. 13, 2000

(30) Foreign Application Priority Data

Oct. 14, 1999 (JP) .......................................... 11-292849

(51) Int. Cl.[7] .......................... H04N 5/235; G03B 9/00; G03B 9/08
(52) U.S. Cl. ....................... 348/362; 396/460; 396/470
(58) Field of Search .............................. 348/463, 470, 348/362; 396/452, 458, 459, 493, 460, 505, 463, 464

(56) References Cited

U.S. PATENT DOCUMENTS

| | | | | |
|---|---|---|---|---|
| 4,487,493 A | * | 12/1984 | Ikari et al. | 396/464 |
| 5,079,575 A | * | 1/1992 | Nii et al. | 396/63 |
| 5,337,110 A | * | 8/1994 | Dowe | 396/449 |
| 5,432,576 A | * | 7/1995 | SanGregory et al. | 396/449 |
| 5,446,514 A | * | 8/1995 | Matsumoto | 396/463 |
| 5,602,610 A | * | 2/1997 | Akimoto et al. | 396/449 |
| 6,086,267 A | * | 7/2000 | Tsuzuki et al. | 396/459 |
| 6,089,760 A | * | 7/2000 | Terada | 396/463 |
| 6,343,881 B1 | * | 2/2002 | Yaginuma | 396/449 |

FOREIGN PATENT DOCUMENTS

| | | | | |
|---|---|---|---|---|
| JP | 10-221740 | | 8/1998 | |
| JP | 10221740 A | * | 8/1998 | ............ G03B/9/10 |
| JP | 11-072822 | | 3/1999 | |

* cited by examiner

Primary Examiner—Wendy R. Garber
Assistant Examiner—Timothy J. Henn
(74) Attorney, Agent, or Firm—Pillsbury Winthrop Shaw Pittman LLP

(57) ABSTRACT

A lens shutter has a diaphragm blade, a shutter blade, and a motor with a rotor reciprocatingly turned between an initial position and a final position by a current applied to a coil, to move the diaphragm blade to stop at an aperture regulating position and the shutter blade between an aperture open position and an aperture close position in cooperation with a first forcing member urging the diaphragm blade toward the aperture regulating position, a stopper for keeping the diaphragm blade at the aperture regulating position and a second forcing member urging the rotor against movement for the final position at least after the diaphragm blade abuts on the stopper. A magnetic device is provided to keep the rotor at positions where the aperture is fully opened and closed, respectively, even when the current to the coil is interrupted.

8 Claims, 5 Drawing Sheets

LENS SHUTTER FOR DIGITAL STILL CAMERAS

BACKGROUND OF THE INVENTION

1. Field of the Invention

The present invention generally relates to a motor-driven shutter for use in a digital still camera, which enables photographing by selectively entering a small-diameter aperture into a large-diameter exposure aperture formed in a base plate.

2. Description of the Related Art

Most of recent digital still cameras are configured so that an image of an object, which is formed on an image pickup device, such as a CCD, can be observed through a monitor, when a power supply switch is closed. Further, among such cameras, there is known a camera of the type, in which a photographing start signal is supplied to an image pickup device when a release button is depressed so as to take a picture, and in which an exposure aperture is closed with a shutter blade when the photographing is completed. Further, most of cameras of such a type are configured in such a manner as to actuate a shutter blade by means of a motor, and to enable observation of an image of an object by putting an exposure aperture into an opened state again after the exposure aperture is closed in a finishing stage of photographing.

Meanwhile, among digital cameras, there is known a camera having the diaphragm blade. In this case, there are two types of diaphragm mechanisms. One is adapted to have a plurality of diaphragm blades and enabled to continuously change the diameter of an exposure aperture. The other is adapted to selectively enter a preliminarily prepared aperture of a predetermined diameter into an exposure aperture. In either of the cameras respectively having the diaphragm mechanisms of these types, there are two manners of performing a diameter control operation. One is to start a diameter control operation in a stage in which a power supply switch is closed. The other is to perform a diameter control operation after the release button is depressed and before photographing is started. Further, recently, in most of the cameras, a diaphragm mechanism is actuated by a motor.

Moreover, there has been developed a motor for actuating a shutter blade and a diaphragm blade in this manner, which is previously called "an iris motor" and recently called "a moving magnet motor". This motor is configured so that an output pin (or driving pin) extending in parallel with a rotation shaft of a rotor constituted by a permanent magnet (usually, a two-pole permanent one) is integrally formed therewith in a radial position of the rotor, and that the rotor can be turned by an angle within a predetermined range in a direction corresponding to a direction in which a current is supplied to a stator coil by energizing thereof. Further, this motor has features that can be manufactured at low cost and miniaturized still more and reduce power consumption, as compared with a stepping motor. The present invention relates to a shutter for a digital still camera, in which the shutter blade and the diaphragm blade are actuated by using a moving magnet motor.

Although a moving magnet motor is advantageous in cost reduction, miniaturization, and power consumption reduction over a stepping motor, it is very troublesome in the present situation, in which the cost and size of a camera should be reduced, that a motor for actuating a shutter blade is provided separately from a motor for actuating the diaphragm blade. It is, thus, required that both the shutter blade and the diaphragm are preferably actuated by a single moving magnet motor.

However, it is not easy for a moving magnet motor to satisfy such a requirement. That is, in the case of a camera that photographs by selecting a small-diameter aperture which is regulated by the diaphragm blade, and a large-diameter aperture regulated by an exposure aperture formed in a base plate, it is required that a rotor can be stopped in each of a fully open state in which both the shutter blade and the diaphragm blade retreat from the exposure aperture, a diameter regulating state in which the diaphragm blade enters into the exposure aperture to regulate a small-diameter aperture, and in a closed state in which the shutter blade closes the exposure aperture. In addition, it is also required that the stopped state of the rotor is reliably maintained at least in the fully open state and the diameter regulating state, even when the energization of a stator coil is interrupted.

SUMMARY OF THE INVENTION

Accordingly, a primary object of the present invention is to provide a shutter for a digital still camera, wherein a motor of the type determining the rotation direction of a rotor according to a direction in which electric current is supplied to a stator coil, is enabled to actuate both of a shutter blade and a diaphragm blade by a driving pin integrally provided with the rotor.

Further, another object of the present invention is to provide a shutter for a digital still camera, which is enabled to reliably maintain the rotational position of the rotor at least in the fully open state and the diameter regulating state, even when the energization of a stator coil is interrupted.

To achieve the foregoing objects, according to the present invention, there is provided a shutter for a digital still camera, which comprises a motor having a driving pin integrally provided with a permanent magnetic rotor in such a manner as to extent in parallel with a rotation shaft of the rotor that reciprocatingly moves by a predetermined angle from an initial position correspondingly to a direction, in which electric current is supplied to a stator coil, at least one diaphragm blade being operative to follow the driving pin and move to a predetermined diameter regulating position when the rotor moves from the initial position, and operative to be returned to a fully open position of a circular exposure aperture when the rotor returns to the initial position, first pushing means for pushing the diaphragm blade so that the diaphragm blade moves to the diameter regulating position, at least one shutter blade for fully opening the exposure aperture when the rotor is in the initial position, and for operating together with the driving pin and performing operations of opening and closing the exposure aperture during the rotor reciprocatingly moves, second pushing means for pushing the rotor in such a manner as to cause the rotor to return from a closed position, in which the exposure aperture is closed, and for stopping the rotor at a rotational position corresponding to the diameter regulating position in cooperation with the first pushing means when the rotor is in the vicinity of the rotational position and the energizing of the coil is interrupted, and magnetic holding means respectively disposed at plural places facing the peripheral surface of the rotor and enabled to maintain the stopped position of the rotor by a magnetic force of the rotor, which acts from the rotor thereto, in a fully open state and a closed state of the exposure aperture even when the energizing of the coil is interrupted.

BRIEF DESCRIPTION OF THE DRAWINGS

Other features, objects and advantages of the present invention will become apparent from the following descrip

DETAILED DESCRIPTION OF THE PREFERRED EMBODIMENT

Figure 1:
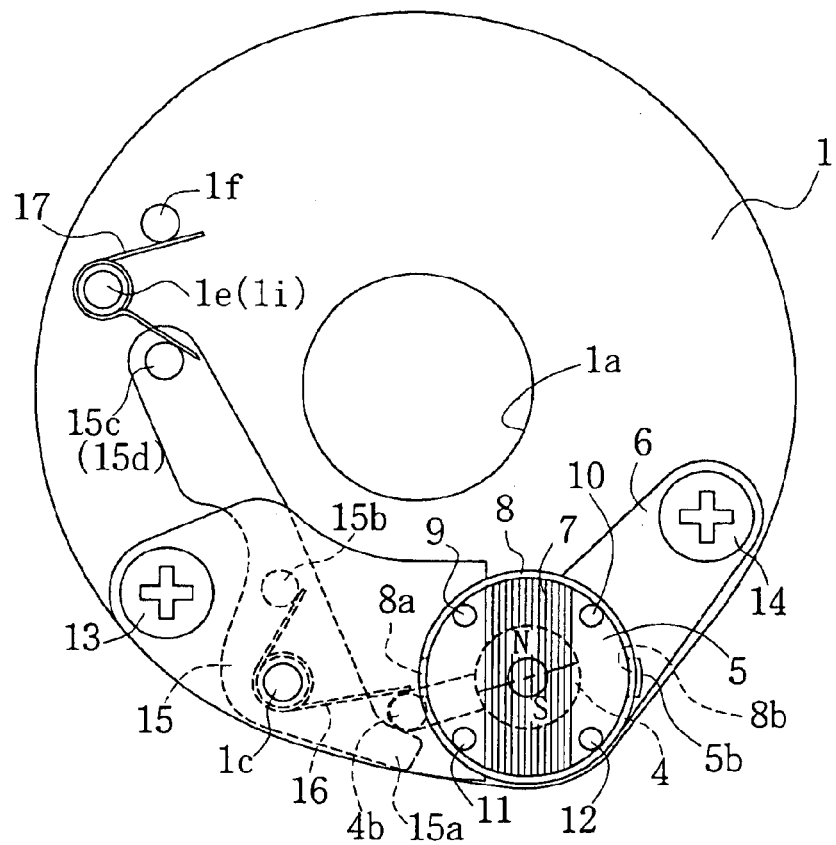
- FIG. 1 is a plan view illustrating an embodiment incorporated into a camera when viewed from an image pickup device side.
Figure 3:
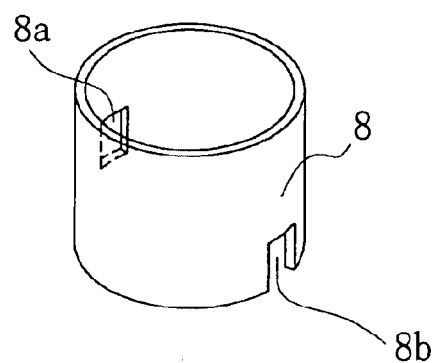
FIG. 3 is a perspective view illustrating a yoke in such a manner as to facilitate the understanding of the shape thereof.
Figure 2:
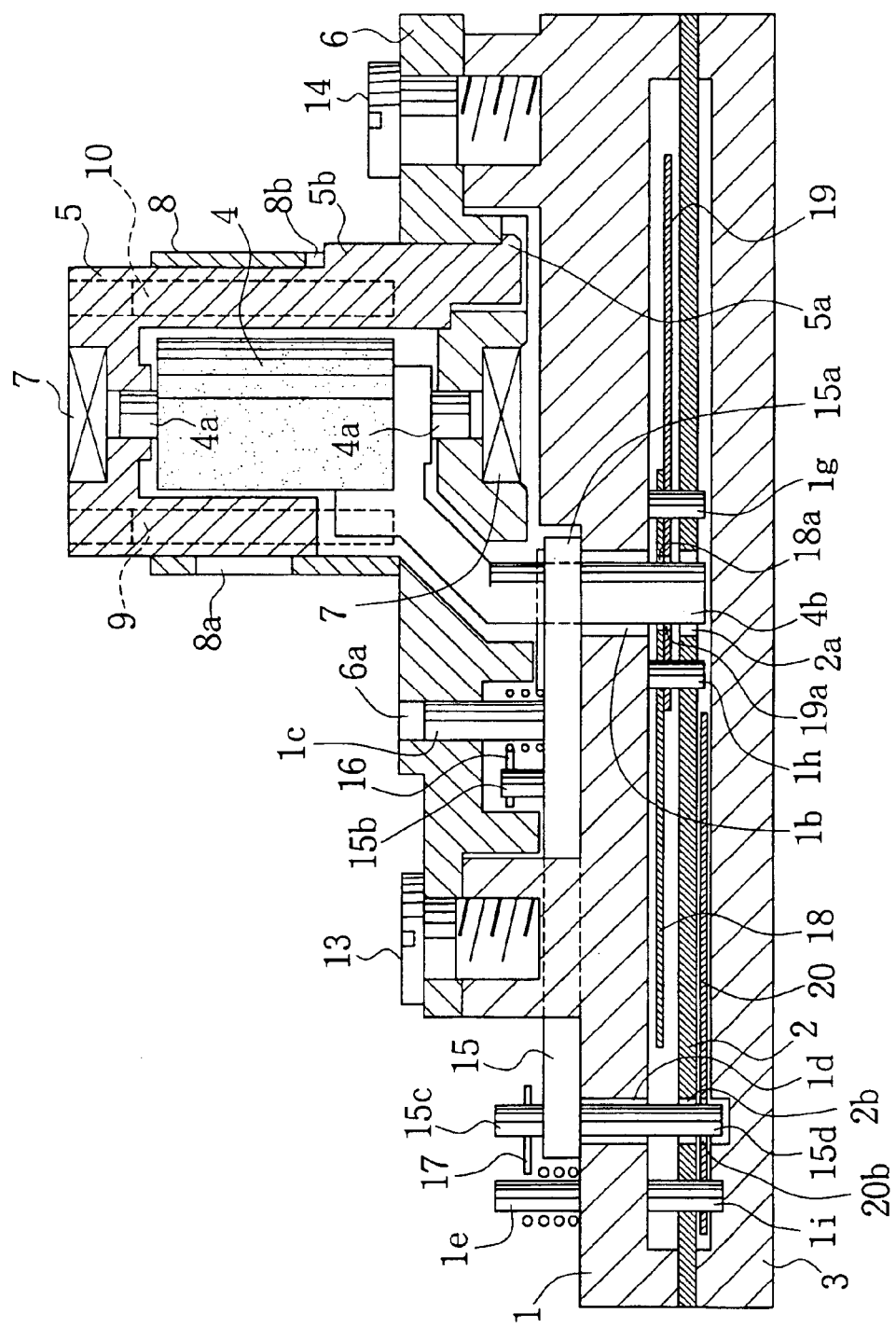
FIG. 2 is a sectional view illustrating a primary part of the embodiment shown in FIG. 1.
Figure 4:
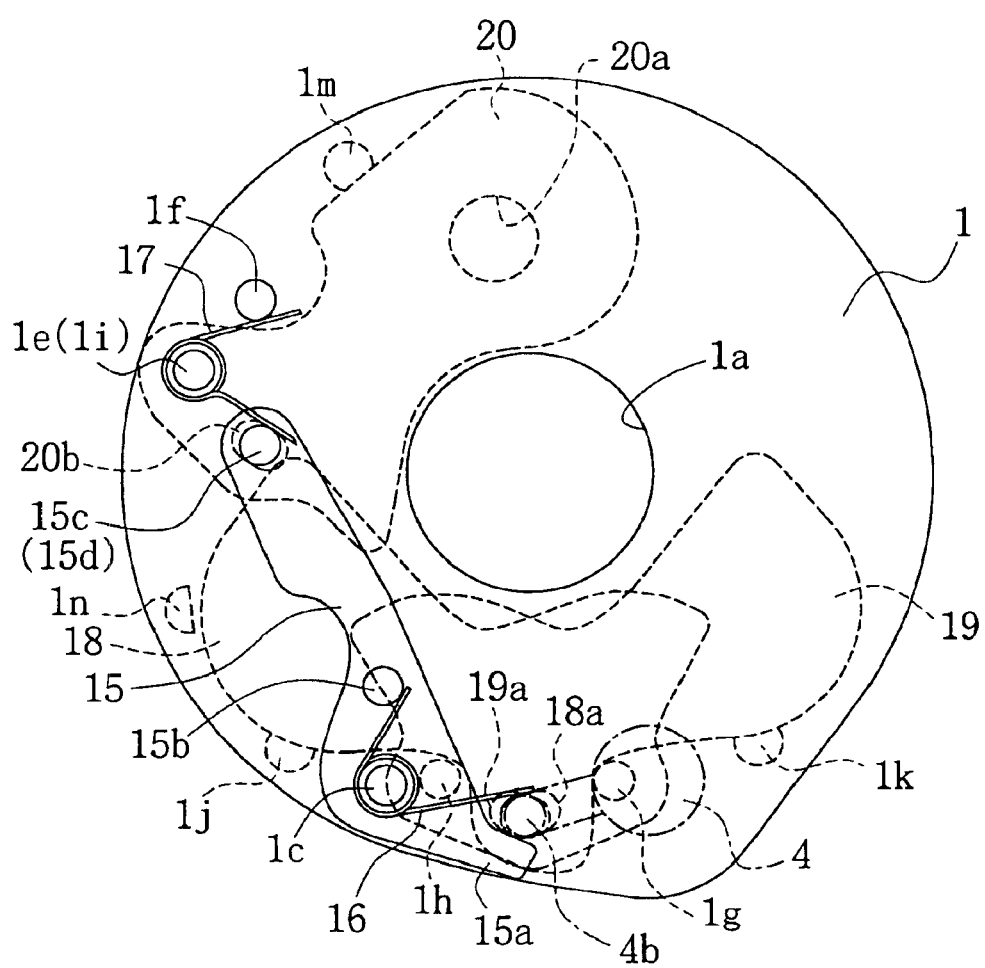
FIG. 4 is a plan view illustrating each blade chamber in a state illustrated in FIG. 1 for understanding thereof.
Figure 5:
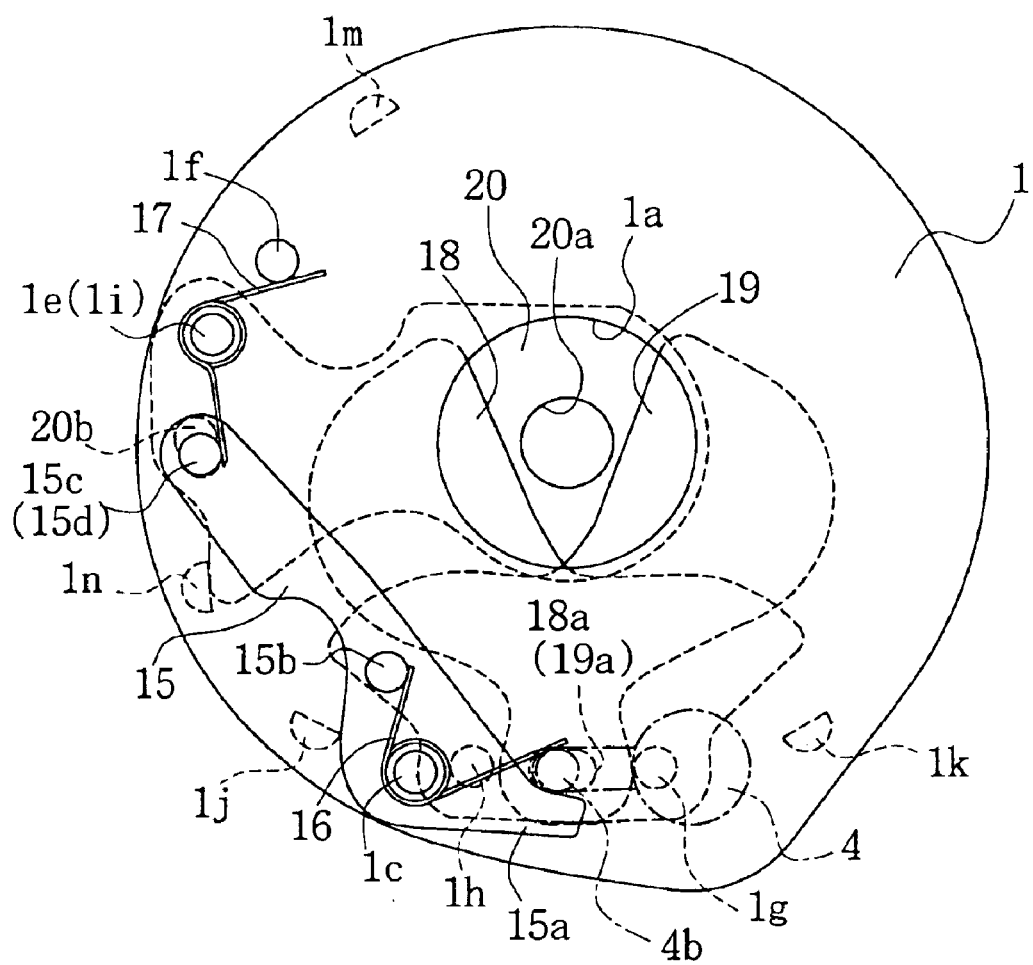
FIG. 5 is a plan view illustrating a state in which a rotor is turned from the position shown in FIG. 4 and a small-diameter aperture is set by a diaphragm blade.
Figure 6:
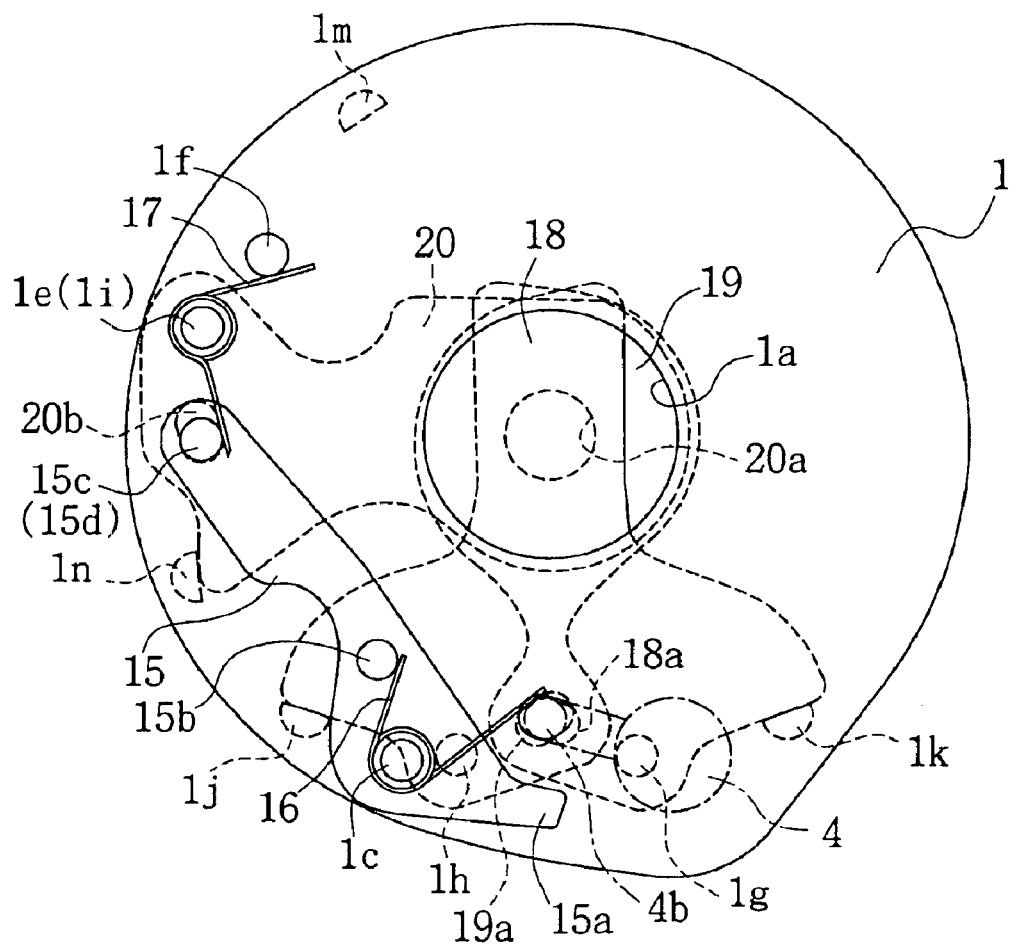
FIG. 6 is a plan view illustrating a state in which the rotor is turned still more from a position shown in FIG. 5 and thus the shutter blade is closed.

Hereinafter, an embodiment of the present invention will be described in detail by referring to FIGS. 1 to 6. Incidentally, FIG. 1 is a plan view illustrating an embodiment incorporated into a camera when viewed from an image pickup device side. FIG. 2 is a sectional view illustrating a primary part of the embodiment shown in FIG. 1. FIG. 3 is a perspective view illustrating a yoke shown in FIGS. 1 and 2 in such a manner as to facilitate the understanding of the shape thereof. Further, FIGS. 4 to 6 are plan views drawn by omitting most of the constituent elements of a motor shown in FIG. 1. FIG. 4 illustrates an initial state similar to that illustrated in FIG. 1. FIG. 5 illustrates a state in which a rotor is turned from the position shown in FIG. 4 and a small-diameter aperture is set by a diaphragm blade. FIG. 6 illustrates a state in which the rotor is turned still more from the position shown in FIG. 5, and thus the shutter blade is closed.

First, the configuration of this embodiment is described hereinbelow with reference to FIGS. 1 to 4. As illustrated in FIG. 2, a shutter base plate 1, an intermediate plate 2, and an auxiliary base plate 3 are provided therein by providing a predetermined space thereamong. Further, these plates are mounted therein by appropriate means. A space defined between the shutter base plate 1 and the intermediate plate 2 is used as a blade chamber for accommodating a shutter blade. Furthermore, a space defined between intermediate plate 2 and the auxiliary base plate 3 is used as a blade chamber for accommodating a diaphragm blade. Moreover, as illustrated in FIG. 1, a circular aperture 1a is formed in the central portion of the shutter base plate 1. An aperture of the same shape (not shown) is formed in each of the intermediate plate 2 and the auxiliary base plate 3. An exposure aperture is formed by concentrically arranging these three apertures. That is, the exposure aperture serves as a maximum-diameter aperture that regulates the optical path of an object light.

A moving magnet motor is mounted on the top surface side (that is, the pickup-device-side) of the shutter base plate 1. A rotor 4 is constituted by a two-pole permanent magnet magnetized in a radial direction. In this embodiment, each of a rotation shaft 4a and a driving pin 4b is made of a synthetic resin. Further, the driving pin 4b extending in parallel with the rotation shaft 4a is provided therein in such a way as to penetrate through an elongated hole 1b formed in the shutter base plate 1 and through an elongated hole 2a formed in the intermediate plate 2 (these elongated holes are illustrated only in FIG. 2). Moreover, a stator frame consists of an upper frame 5 and a lower frame 6, each of which is made of a synthetic resin. Both ends of the rotation shaft 4a are bearing-supported by these frames that are attached to each other through a hook portion 5a (see FIG. 2) of the upper frame. Furthermore, a coil 7 is wound therearound in such a manner as to cover the bearing-support portions of the upper frame 5 and the lower frame 6.

Moreover, the upper frame 5 is cylindrically formed, and a cylindrical yoke 8 is fitted onto an outer peripheral portion thereof. As illustrated in FIG. 3, a rectangular window portion 8a and a cut-away portion 8b, which is formed by opening a portion corresponding to one side of a rectangular section thereof, are provided in the yoke 8. Further, the positioning of the yoke 8 in the rotational direction is performed by fitting a projecting portion 5b into the cut-away portion 8b. Furthermore, as illustrated in FIG. 1, 4 iron pins 9, 10, 11, and 12 are press-fitted into a groove hole formed in the upper frame 5. Further, the iron pins 9 and 10 are placed at positions, which are symmetrical to the positions of the iron pins 11 and 12 with respect to a line passing through the window portion 8a, the rotation shaft 4a, and the cut-away portion 8b. Moreover, the positions of the iron pins 9 and 11 are symmetrical to those of the iron pins 10 and 12 with respect to a line, which is perpendicular to the former line and passes through the rotation shaft 4a. Furthermore, the motor constructed in this way is attached to the shutter base plate 1 with two screws 13 and 14 after a shaft 1c of the shutter base plate 1 is fitted into a hole 6a formed in the lower frame 6.

Next, a diaphragm actuating member 15 attached to the image-pickup-device-side face of the shutter base plate 1, similarly as the motor, is described hereinbelow. This diaphragm actuating member 15 is rotatably mounted on the shaft 1c of the shutter base plate 1 and has an engaging portion 15a and two spring engaging portions 15b and 15c. Further, an actuating pin 15d concentrically provided on the rear side of the spring engaging portion 15c penetrates through the elongated hole id formed in the shutter base plate 15 and the elongated hole 2b of the intermediate plate 2 (these holes are shown only in FIG. 2). An end portion of the pin 15d extends into the blade chamber for accommodating the diaphragm blade. Further, this diaphragm actuating member 15 is engaged with two springs 16 and 17. That is, the spring 16 is wound around the shaft 1c of the shutter base plate 1, and has an end thereof engaged with the spring engaging portion 15b, and also has the other end engaged with the driving pin 4b of the rotor 4. Moreover, the spring 17 is wound around the shaft 1e of the shutter base plate 1, and has an end engaged with the spring engaging portion 15c, and also has the other end engaged with a spring engaging portion 1f of the shutter base plate 1.

Next, the constitution of the inside of each of the blade chambers is described hereinbelow with reference to FIGS. 2 and 4. Incidentally, in FIG. 4, for convenience of description, the rotor is indicated by a one-dot chain line. This is the same with FIGS. 5 and 6, which will be referred to in the following description of an operation. Thus, first, three shafts 1g, 1h, and 1i are provided on the blade-chamber-side face of the shutter base plate 1. These shafts are respectively fitted into the holes of the intermediate plate 2. Among these shafts, the shaft 1i is concentrically erected with the shaft 1e and has an end portion that is inserted into a hole formed in the auxiliary base plate 3. Further, in addition to these, 4 stoppers 1*j*, 1*k*, 1*m*, 1*n* are formed on the blade-chamber-side face of the shutter base plate 1. At least the stoppers 1*m* and 1*n* extend to the blade chamber for accommodating the diaphragm blade.

A pair of shutter blades 18 and 19 is rotatably connected to each of the shafts 1*g*, 1*h*. The driving pin 4*b* is fitted into elongated holes 18*a* and 19*a* of the shutter blades 18 and 19. Thus, when the rotor 4 is turned clockwise as viewed in FIG. 4, the shutter blades 18 and 19 perform a closing operation. Thereafter, when the rotor 4 rotates counterclockwise, the shutter blades 18 and 19 perform a opening operation. Further, a diaphragm blade 20 is rotatably attached to the shaft 1*i*. This diaphragm blade 20 has a small-diameter circular aperture 20*a*. An actuating pin 15*d* of the diaphragm actuating member 15 is fitted into an elongated hole 20*b*. Therefore, when the diaphragm actuating member 15 rotates counterclockwise as viewed in FIG. 4, the diaphragm blade 20 enters an aperture 20*a* into the aperture 1*a*. Thereafter, when the diaphragm actuating member 15 turns clockwise, the diaphragm blade 20 returns to the state illustrated in FIG. 4.

Next, an operation of this embodiment is described hereinbelow by referring to FIGS. 5 and 6 in addition to FIGS. 1 and 4. FIGS. 1 and 4 illustrate a state in which a power supply switch of a camera is not closed, that is, an unused state of the camera. Thus, the coil 7 is not energized. Further, the spring 17 is stretched and pushes the diaphragm actuating member 15 so that the member 15 is rotated counterclockwise. However, the diaphragm actuating member 15, whose engaging portion 15*a* cannot push the driving pin 4*b* and turn the rotor 4, which is in the initial position, clockwise, is maintained in this state, because of the fact that the rotor 4 is pushed by an own magnetic force thereof in such a manner as to be turned counterclockwise even when the coil 7 is in a non-energized state.

That is, because the window portion 8*a*, the cut-away portion 8*b*, and the iron pins 9, 10, 11, and 12 (hereunder part or all of these elements in this embodiment will be referred to as "holding means") are arranged as illustrated in FIG. 1, the magnitude of an attractive force acting between an N-pole of the rotor 4 and the iron pin 9 in this state is larger than that of an attractive force acting between the N-pole and the iron pin 10. Moreover, an attractive force acts between the N-pole and the window portion 8*a*. In contrast, the magnitude of an attractive force acting between an S-pole of the rotor 4 and the iron pin 12 is larger than that of an attractive force acting between the S-pole and the iron pin 11. In addition, an attractive force acts between the S-pole and the cut-away portion 8*b*. Consequently, a force of causing the rotor 4 to rotate counterclockwise is given to the rotor 4, so that the driving pin 4*b* pushes the engaging portion 15*a* and causes the diaphragm actuating member 15 to rotate clockwise against the pushing force of the spring 17. Further, the shutter blades 18 and 19 abut against the stoppers 1*j* and 1*k*, while the diaphragm blade 20 abuts against the stopper 1m. Thus, the rotor 4 is maintained in the initial position thereof.

Incidentally, such a state is sometimes maintained under some conditions even when the iron pins 9 and 11 are omitted or when the iron pins 10 and 12 are omitted. Further, such a state is sometimes maintained when one or both of defective portions (that is, the window portion 8*a* and the cut-away portion 8*b*). However, in consideration of reliability, this embodiment has all of such constituent elements. Moreover, in the case that a shutter has 4 iron pins like this embodiment, as long as the iron pins 9 and 10 are placed at the positions that are symmetrical to those of the iron pins 11 and 12 with respect to the line passing through the window portion 8*a* and the cut-away portion 8*b*, there is no necessity for setting the positions of the iron pins 9 and 11 in such a manner as to be symmetrical to those of the iron pins 10 and 12 with respect to the line that is perpendicular to the former line and passes through the rotation shaft 4*a*.

When the shutter is in the state illustrated in FIGS. 1 and 4, the power supply switch is first closed. Among cameras each having a monitor, there is known a camera enabled to automatically set a diaphragm aperture, which meets depth-of-field requirements, by the action of a photometer or a range finder when a power supply switch is closed, even in the case that a release button is not depressed. The present invention can be applied to a camera of such a type. However, the following description describes the case of using the shutter of the present invention in a camera of the type, in which the diaphragm aperture is not automatically set only by closing the power supply switch. Therefore, in the case of this embodiment, the coil 7 is not energized even when the power supply switch is closed. Consequently, the state illustrated in FIGS. 1 and 4 are maintained as it is.

Thus, first, an operation of this embodiment in the case of selecting a small-diameter aperture at the time of photographing is described hereinbelow. When a release button is depressed so as to take a picture, the energization of the coil 7 is started in such a manner as to supply electric current thereto in a forward direction, and the rotor 4 is rotated clockwise. Thus, the diaphragm actuating member 15 is rotated by the pushing forces of the springs 16 and 17 in such a way as to cause the engaging portion 15*a* to follow the driving pin 4*b*, and as to enter the aperture 20*a* of the diaphragm blade 20 into the aperture 1*a*. On the other hand, concurrently with this, the two shutter blades 18 and 19 are relatively actuated by the driving pin 4*b*, so that the aperture 1*a* is closed. At that time, the diaphragm blade 20 is actuated together with the diaphragm actuating member 15. Thus, initially, the operating speed of the diaphragm blade 20 is slightly lower than those of the shutter blades 18 and 19. When the diaphragm blade 20 abuts against the stopper 1*n*, an operation of this blade 20 is stopped. FIG. 5 illustrates this state.

Further, when the rotor 4 reaches close to the position thereof illustrated in FIG. 5, the energization of the coil 7 is interrupted. Thence, the position thereof illustrated in FIG. 5 is reliably maintained until the next energization of the coil 7 is performed. That is, in this state, the boundary between the magnetic poles of the rotor 4 almost coincides with the line connecting the window portion 8*a* to the cut-away portion 8*b*. Attractive forces acting among the magnetic poles and the holding means are balanced with one another, so that no effective torque is provided to the rotor 4. Therefore, in the case that the coil 7 is not energized, the rotor 4 is returned to the position thereof illustrated in FIG. 5 by the pushing force of the spring 16 even when the rotor 4 is slightly rotated clockwise from the position thereof illustrated in FIG. 5. Moreover, in the case that the diaphragm actuating member 15 does not reach the position illustrated in FIG. 5, the rotor 4 may slightly pass the position illustrated in FIG. 5, depending upon the timing with which the rotor 4 is turned clockwise. In this case, the rotor 4 is returned to the position thereof illustrated in FIG. 5 by the engaging portion 15*a* of the diaphragm actuating member 15.

Incidentally, the case, in which the energization of the coil 7 is interrupted when the rotor 4 reaches close to the position thereof illustrated in FIG. 5, has been described in the foregoing description. However, in the case of this embodiment, the state illustrated in FIG. 5 can reliably be obtained even when the energization of the coil is interrupted earlier than described in the foregoing description. This enables reduction in the power consumption. That is, as described above, the state illustrated in FIG. 4 is maintained because of the fact that the magnitude of a force (hereunder referred to as "a holding force for holding the rotor in the fully open position"), which is obtained from the attractive force due to the magnetic force of the rotor 4 and from the pushing force of the spring 16, is larger than the magnitude of a force (hereunder referred to as "the spring force of the spring 17"), which is obtained from the pushing forces of the springs 16 and 17, to rotate the diaphragm actuating member 15 counterclockwise. Then, when the coil 7 is energized to thereby rotate the rotor 4 clockwise, the extent of reduction in the spring force of the spring 17 is smaller than that of reduction in the holding force for holding the rotor to the fully open position. Thus, the magnitude of the spring force of the spring 17 is larger than that of the holding force after a certain moment. Therefore, at any time after such a moment, the rotor 4 can inevitably be rotated to the position illustrated in FIG. 5 and stopped.

Thus, when the small-diameter aperture 20a is inserted into the aperture 1a, a photographing start signal is then given to the image pickup device, such as CCD. Further, after a lapse of a predetermined photographing time, a control circuit outputs a closing signal, in response to which the shutter blades 18 and 19 are closed. Then, the energization of the coil 7 is performed again for a predetermined time in such a way as to provide a current to the coil 7 in a forward direction. Thus, the rotor 4 is rotated clockwise from the position thereof illustrated in FIG. 6 still more against the pushing force of the spring 16. Then, the shutter blades 18 and 19 are caused to perform a closing operation of closing the aperture 20a. However, the diaphragm blade 20 has already abutted against the stopper in and thus does not operate. Furthermore, FIG. 6 illustrates a state in which the stoppers 1k and 1j prevents and stops the closing operation of the shutter blades 18 and 19.

In the state illustrated in FIG. 6, the rotor 4 is pushed by the spring 16 in such a manner as to rotate counterclockwise. In the case of this embodiment, even when the energization of the coil 7 is interrupted in this state, the rotor 4 is not rotated counterclockwise. Thus, this state is maintained. That is, in this state, the magnitude of the attractive force acting between the N-pole of the rotor 4 and the iron pin 10 is larger than that of the attractive force acting between the N-pole of the rotor 4 and the iron pin 9. Moreover, an attractive force acts between the N-pole of the rotor 4 and the cut-away portion 8b of the yoke B. On the other hand, the magnitude of the attractive force acting between the S-pole of the rotor 4 and the iron pin 11 is larger than that of the attractive force acting between the S-pole of the rotor 4 and the iron pin 12. Moreover, an attractive force acts between the S-pole of the rotor 4 and the window portion 8a of the yoke 8. Consequently, a force (hereunder referred to as "a holding force for holding the rotor in the closed position), by which the rotor 4 is rotated clockwise, is provided to the rotor 4. The magnitude of this force is larger than that of the pushing force of the spring 16.

Thus, in the case that the energization of the coil 7 is interrupted in the closed state, the interruption timing is set so that the energization thereof is interrupted just before the shutter blades 18 and 19 completely close the aperture 20a. That is, in the state illustrated in FIG. 5, the holding force for holding the rotor in the closed state hardly acts. Further, when the energization of the coil 7 is performed in this state in such a way as to supply a current thereto in a forward direction, thereby to rotate the rotor 4 clockwise, the spring 16 is stretched, so that the pushing force of the spring 16 gradually increases. However, the holding force for holding the rotor in the closed position increases at a rate in excess of the rate at which such a pushing force increases. Furthermore, after a certain moment, the magnitude of the holding force for holding the rotor in the closed position is larger than the magnitude of the pushing force of the spring 16. Therefore, whenever the energization of the coil 7 is interrupted after the certain moment, the rotor 4 inevitably rotates to the position illustrated in FIG. 6. In such a case, power saving effects are enhanced.

After the aperture 20a is closed in this way, data representing a result of photographing is stored in a memory device. Then, the shutter blades 18 and 19 are caused to perform an opening operation. In this case, conversely to the aforementioned case, the energization of the coil 7 is performed for a predetermined time in such a way as to supply a current thereto in a reverse direction. Thus, a force or torque, by which the rotor 4 is rotated counterclockwise, is provided to the rotor 4. That is, the rotor 4 is rotated counterclockwise by this torque and the pushing force of the spring 16 against the holding force for holding the rotor in the closed position. Furthermore, only the shutter blades 18 and 19 are caused to perform the opening operation until the rotor 4 reaches the position illustrated in FIG. 5. Thereafter, the rotor 4 is rotated against the spring force of the spring 17 by the torque and the holding force for holding the rotor in the fully open position. Moreover, an operation of returning the diaphragm blade 20 is performed. Then, the shutter blades 18 and 19 abut against the stoppers 1j and 1k, respectively. Furthermore, the diaphragm blade 20 abuts against the stopper lm. In this stage, the rotation of the rotor 4 is stopped. Further, the energization of the coil 7 is interrupted, so that the shutter is reset to the state illustrated in FIGS. 1 and 4.

Incidentally, in the case that the camera is set according to this embodiment in such a way as to successively perform photographing, and that the diaphragm aperture is automatically set when the power supply switch is closed, differently from this embodiment, the next photographing operation can be immediately performed in the state illustrated in FIG. 5 by interrupting the energization of the coil 7 when the rotor 4 reaches close to the position illustrated in FIG. 5 in the process of resetting the shutter.

Next, the case, in which a large-diameter aperture is selected when photographing is performed, is described hereinbelow. Incidentally, parts of the following description, which overlap with the foregoing description of the case that the small-diameter aperture is selected, are omitted or simplified. First, when a release button is depressed to take a picture, a photographing start signal is immediately supplied to the image pickup device, such as CCD, in this case. Then, after a lapse of a predetermined photographing time, the control circuit issues a closing signal to close the shutter blades 18 and 19. Thus, the energization of the coil 7 is started in such a manner as to supply electric current thereto in a forward direction, and the rotor 4 is rotated clockwise.

Consequently, the shutter blades 18 and 19 are relatively actuated by the driving pin 4b to thereby close the aperture 1a. The diaphragm blade 20 also closes the aperture 1a by slightly being behind the shutter blades 18 and 19 for the aforementioned reason. That is, in this stage, the aperture 1a is closed by these three blades from three directions. Further, when the aperture 20a of the diaphragm blade 20 enters into the aperture 1a (namely, these apertures start overlapping each other), the shutter blades 18 and 19 finish the operation of closing the aperture 1a, as illustrated in FIG. 6. Immediately after this, the diaphragm blade 20 is in the state illustrated in FIG. 6. Incidentally, even if there occurs the case that the aperture 20a of the diaphragm blade 20 enters into the aperture 1a before the shutter blades 18 and 19 completely close the aperture 1a, such a state will be a moment. Accordingly, this may be permitted as the photographing conditions.

After the shutter is thus put into the state illustrated in FIG. 6, the rotor 4 is not rotated counterclockwise even when the energization of the coil 7 is interrupted. This state is maintained. Further, as described above, the energization of the coil 7 may be performed during the rotor 4 rotates. Then, after the shutter blades 18 and 19 close the aperture 1a, data representing a result of the photographing is stored in the memory device. Further, the shutter is reset. Such an operation performed in this case is substantially the same as that in the case of selecting the small-diameter aperture.

Meanwhile, even in the case that a relatively large number of holding means are provided in the shutter like this embodiment, and that the initial state (that is, the fully open state) and the closed state of the aperture 1a are thus reliably maintained, this is achieved by utilizing only the magnetic force of the rotor 4. Thus, it is not ensured that the positions of the shutter blades 18 and 19, and the position of the diaphragm blade 20, namely, the rotational position of the rotor 4 are normal positions illustrated in FIGS. 4 and 6 at the moment at which the energization of the coil 7, which has been in the non-energized state, is started. Moreover, because a time period, in which the shutter is in the state illustrated in FIG. 6, is very short, there is less likelihood that the shutter blades 18 and 19, and the diaphragm blade 20, and the rotor 4 are not in the normal positions illustrated in FIGS. 4 and 6 when the energization of the coil 7 is started. Even when such an unfavorable situation occurs, the shutter is then reset to the state illustrated in FIG. 4. Consequently, there is no problems in particular. However, when such an unfavorable situation occurs during the shutter is in the state illustrated in FIG. 4, there is a fear that a serious problem occurs.

Thus, now consider the case that such an unfavorable situation occurs when the small-diameter aperture is selected. It is preliminarily determined according to design specifications how long a forward current for energization is supplied to the coil 7 so as to rotate the rotor 4, which has been in the position illustrated in FIG. 4, and as to then stop the rotor 4 in the position illustrated in FIG. 5. Therefore, in the case that the rotor 4 is rotated clockwise from the position illustrated in FIG. 4 when the energization of the coil 7 is started in such a way as to supply a current in a forward direction, the rotor 4 is rotated clockwise by a considerable amount. Further, in the case that the energization of the coil 7 is interrupted in a position where the holding force for holding the rotor in the closed position acts on the rotor more effectively than the pushing force of the spring 16, the rotor 4 does not return to the position thereof illustrated in FIG. 5 but is rotated to the position thereof illustrated in FIG. 6. That is, the shutter is brought into a state to be caused just upon completion of photographing.

To prevent an occurrence of such a phenomenon, although the set-up of the shutter is a little time-consuming, it is sufficient that the energization of the coil 7 in such a manner as to supply a current thereto in a reverse direction is performed for a predetermined time before the energization of the coil 7 having been in the state illustrated in FIG. 4 is performed in such a manner as to supply a current thereto in a forward direction, and that thus, the energization of the coil 7 for supplying a current thereto in a forward direction is performed after the rotor 4 is pushed in such a way as to rotate counterclockwise by once performing the energization of the coil 7 for supplying a current thereto in a reverse direction. Furthermore, in the case of photographing by using a large-diameter aperture, a similar phenomenon presents a serious problem. In such a case, it is sufficient that the energization of the coil 7 for supplying a current thereto in a reverse direction is performed once before a photographing start signal is provided to the image pickup device. Furthermore, in the case that the camera is not used for a long term, there is a fear that the blades and the rotor cannot smoothly rotate even when the rotor 4 is in the normal initial position. In such a case, the problem is solved by setting the shutter so that the rotor 4 performs reciprocating motions, regardless of photographing signals, when the power supply switch is closed.

Incidentally, the aforementioned embodiment is adapted so that the energization of the coil 7 for supplying a current in a forward direction is interrupted in a state in which the shutter blades 18 and 19 are closed. However, the present invention is applicable to the case that the energization of the coil 7 for supplying a current thereto in a forward direction is continued until the energization thereof for supplying a current thereto in a reverse direction is performed. Further, although the aforementioned embodiment has the two shutter blades 18 and 19 and the single diaphragm blade 20, the present invention is not limited to the numbers of the blades. However, in the case of using only one shutter blade, although apparent cost is decreased as a result of reducing the number of parts, the miniaturization of the shutter is difficult owing to an increase in the area of the blade. Moreover, the operating angle of the shutter blade should be increased. Furthermore, the shutter may be adapted so that two diaphragm blades are provided therein and relatively actuated, similarly as the shutter blades 18 and 19. In this case, the number of parts is increased. Moreover, there is a defect that it will be difficult to form the small diaphragm aperture as a complete circle.

Further, although the spring 17 pushes the diaphragm actuating member 15 so that the member 15 rotate counterclockwise, and thus the diaphragm blade 20 is pushed in such a manner as to rotate clockwise in the aforementioned embodiment, according to the present invention, it is possible to omit the diaphragm actuating member 15. That is, an example of such a case is that a part of the diaphragm blade 20 is projected in such a manner as to be able to be in contact with the driving pin 4b, similarly as the engaging portion 15a of the diaphragm actuating member 15, and that the spring 17 is directly engaged with the diaphragm blade 20 so that the blade 20 is rotated counterclockwise. Incidentally, in the case of the shutter of such a configuration, the diaphragm blade 20, which would act as the shutter blade in the aforementioned embodiment, cannot serve as the shutter blade in this example when the aperture 1a of a large diameter is closed, so that the aperture 1a cannot be preferably closed by using blades placed at peripheral positions, which are set at nearly uniform angular intervals, in such a way as to extend toward the optical axis.

Additionally, although the spring 16 is wound around the shaft 1c and has an end engaged with the actuating member 15 and has the other end engaged with the driving pin 4b in the aforementioned embodiment, the present invention is not limited to such a configuration. That is, in the case of the shutter of the present invention, it is sufficient that at least the spring 16 pushes and moves the rotor 4 from the position illustrated in FIG. 6 to the position illustrated in FIG. 5. There is no need for winding the spring around the shaft 1c. Moreover, there is no necessity for engaging an end of the spring 16 with the actuating member 15. Additionally, the actuating member 15 may be pushed through another member by the spring 16 without directly engaging the other end of the spring 16 with the driving pin 4b. However, according to the embodiment, the configuration of the entire shutter is simplified. Moreover, the assembling of the shutter is facilitated. Furthermore, because of the facts that the pushing force of the spring 16 is needed during the rotor 4 moves from the position illustrated in FIG. 6 to the position illustrated in FIG. 5, and that the pushing force of the spring 17 is needed during the rotor 4 moves from the position illustrated in FIG. 4 to the position illustrated in FIG. 5, the entire shutter may be configured so that both ends of a spring serves as the two pushing means.

As described above, the shutter of the present invention employs a single moving magnet motor, whose rotor performs reciprocating motions in each of which the rotor is turned by a predetermined angle in a corresponding rotational direction, to thereby actuate both the shutter blade and the diaphragm blade. Thus, the shutter of the present invention is enabled to selectively perform the photographing using a large-diameter aperture regulated by the exposure aperture, and the photographing using a small-diameter aperture regulated by the diaphragm blade. Consequently, the present invention is extremely effective in reducing the cost of the shutter and in performing the miniaturization thereof. Further, in the case of the shutter of the present invention, the stopped state of the rotor can reliably be maintained in the fully open state, in which the exposure aperture is fully opened, and the closed state, and the diameter regulating state in which the diaphragm aperture is regulated by the diaphragm blade. Thus, the present invention can provide a shutter for a digital still camera, which is suitable for reducing the power consumption of a camera.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A lens shutter for digital still cameras comprising:
    a motor having a stator including an energizing coil, having a permanent magnetic rotor reciprocatingly movable for a predetermined angular range between an initial position and a final position in accordance with a direction of a current supplied to said coil, and having a driving pin integrally provided with said rotor and extending in parallel with a rotary shaft of said rotor;
    at least one diaphragm blade, said diaphragm blade leaving a circular exposure aperture fully open when said rotor is in the initial position, moving to a predetermined exposure aperture regulating position as following said driving pin when said rotor moves from the initial position, and being returned by said driving pin to a fully opened position of the circular exposure aperture when said rotor returns to the initial position;
    a first forcing member constructed and arranged to urge said diaphragm blade toward said exposure aperture regulating position;
    a stopper constructed and arranged to keep said diaphragm blade at the exposure aperture regulating position;
    at least one shutter blade, said shutter blade leaving said exposure aperture fully open when said rotor is in the initial position, moving together with said driving pin to close said exposure aperture while said rotor moves from the initial position to the final position, and moving together with said driving pin to be returned to the fully open position of said exposure aperture while said rotor returns to the initial position;
    a second forcing member constructed and arranged to urge said rotor against a movement for the final position at least during a period from a state where said diaphragm blade is caused by said first forcing member to abut on said stopper at the exposure aperture regulating position till a state where said exposure aperture is closed by said shutter blade, and to stop said rotor at a rotational position corresponding to the exposure aperture regulating position when said rotor is in vicinity of the rotational position corresponding to the exposure aperture regulating position with the current to said coil being interrupted; and
    magnetic holding components respectively disposed at plural places facing a peripheral surface of said rotor, and capable of maintaining the stopped position of said rotor by a magnetic force of said rotor, which acts from said rotor thereto, in a fully opened state and a closed state of said exposure aperture even when the current to the coil is interrupted.

2. A lens shutter for digital still cameras according to claim 1, wherein said magnetic holding components comprise at least one first magnetic material member disposed so that, under the state in which said exposure aperture is fully opened, said rotor is rotated by the magnetic force in a direction in which said shutter blade is moved to open said exposure aperture, and at least one second magnetic material member disposed so that, under the state in which said exposure aperture is closed, said rotor is rotated by the magnetic force in a direction in which said shutter blade is moved to close said exposure aperture.

3. A lens shutter for digital still cameras according to claim 2, wherein said magnetic holding components further comprise at least one defective portion formed in a yoke which is disposed so as to surround the peripheral surface of said rotor, and provided at a place where the rotor is rotated by the magnetic force in a direction in which said shutter blade is moved to open said exposure aperture, and positioned so that said rotor is rotated by the magnetic force in a direction in which said shutter blade is moved to open said exposure aperture, under the state in which said exposure aperture is fully opened, and positioned so that said rotor is rotated by the magnetic force in a direction in which said shutter blade is moved to close said exposure aperture, under the state in which said exposure aperture is closed.

4. A lens shutter for digital still cameras according to claim 1, wherein said diaphragm blade is a single diaphragm blade having an aperture of a diameter smaller than that of said exposure aperture.

5. A lens shutter for digital still cameras according to claim 1, wherein said shutter blades are two shutter blades actuated by said driving pin so as to relatively operate.

6. A lens shutter for digital still cameras according to claim 1, wherein said first forcing member comprises a diaphragm actuating member connected to said diaphragm blade and rotatably attached to a shutter base plate, and a first spring engaged with said diaphragm actuating member so that said diaphragm actuating member is able to rotate following said driving pin.

7. A lens shutter for digital still cameras according to claim 1, wherein when said rotor is rotated from the initial position, energization of said coil is performed once so that said rotor rotates in a direction in which said shutter blade performs an opening operation of opening said exposure aperture, and thereafter, energization of said coil is performed so that said rotor rotates in an opposite direction.

8. A lens shutter for digital still cameras comprising:

a motor having a stator including an energizing coil, having a permanent magnetic rotor reciprocatingly movable for a predetermined angular range between an initial position and a final position in accordance with a direction of a current supplied to said coil, and having a driving pin integrally provided with said rotor and extending in parallel with a rotary shaft of said rotor;

at least one diaphragm blade, said diaphragm blade leaving a circular exposure aperture fully open when said rotor is in the initial position, moving to a predetermined exposure aperture regulating position as following said driving pin when said rotor moves from the initial position, and being returned by said driving pin to a fully opened position of the circular exposure aperture when said rotor returns to the initial position;

a first forcing member constructed and arranged to urge said diaphragm blade toward said exposure aperture regulating position;

at least one shutter blade, said shutter blade leaving said exposure aperture fully open when said rotor is in the initial position, moving together with said driving pin to close said exposure aperture while said rotor moves from the initial position to the final position, and moving together with said driving pin to be returned to the fully open position of said exposure aperture while said rotor returns to the initial position;

a second forcing member constructed and arranged to urge said rotor against a movement for the final position at least during a period from a state where said diaphragm blade is at the exposure aperture regulating position till a state where said exposure aperture is closed by said shutter blade, and to stop said rotor at a rotational position corresponding to the exposure aperture regulating position when said rotor is in vicinity of the rotational position corresponding to the exposure aperture regulating position with the current to said coil being interrupted; and magnetic holding components respectively disposed at plural places facing a peripheral surface of said rotor, and capable of maintaining the stopped position of said rotor by a magnetic force of said rotor, which acts from said rotor thereto, in a fully opened state and a closed state of said exposure aperture even when the current to the coil is interrupted, wherein said first forcing member comprises a diaphragm actuating member connected to said diaphragm blade and rotatably attached to a shutter base plate, and a first spring engaged with said diaphragm actuating member so that said diaphragm actuating member is able to rotate following said driving pin, and wherein said second forcing member is a second spring wound around the rotation shaft of said diaphragm actuating member and having one end engaged with said diaphragm actuating member and the other end engaged with said driving pin.

* * * * *